2,631,222

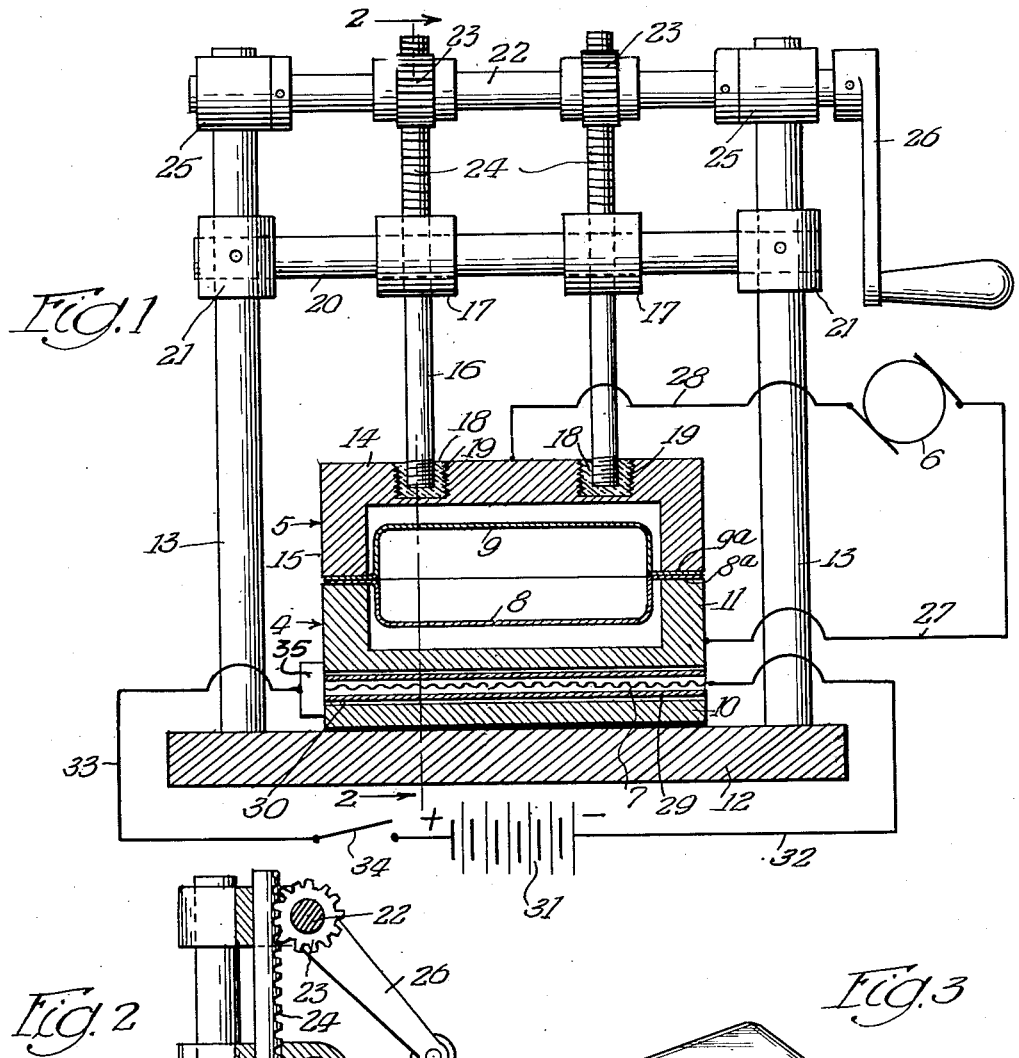
March 10, 1953     K. NIEBLING     2,631,222
APPARATUS FOR AND METHOD OF ELECTRIC WELDING OF FILMS
OF POLYVINYL CHLORIDE OR LIKE THERMOPLASTIC MATERIAL
Filed Feb. 6, 1952
Inventor
Kurt Niebling Patented Mar. 10, 1953

UNITED STATES PATENT OFFICE 2,631,222

APPARATUS FOR AND METHOD OF ELECTRIC WELDING OF FILMS OF POLYVINYL CHLORIDE OR LIKE THERMOPLASTIC MATERIAL

Kurt Niebling, Munich, Germany

Application February 6, 1952, Serial No. 270,192
In Germany July 16, 1951

7 Claims. (Cl. 219—47)

The present invention relates generally to the art of welding. More particularly the invention relates to electric welding of thermoplastic films, such, for example, as those of polyvinyl chloride or similar so-called "plastic" material.

It has heretofore been proposed to employ in connection with welding of thermoplastic films that are capable of being welded a welding apparatus comprising a pair of opposed electrodes which are mounted to move relatively to one another into and out of an operative position and are in circuit with, or electrically connected to, a high frequency electric generator. The welding operation is effected by first positioning in abutting relation the films to be welded and then placing the juxtapositioned films between the electrodes while the latter are out of their operative position. Thereafter the electrodes of the apparatus, while connected to receive high frequency current from the generator, are moved into their operative position wherein they serve to clamp the films together. When the electrodes are in their operative position the high frequency electric field which is produced between the electrodes in connection with operation of the generator produces such heat as to effect welding together of the thermoplastic films. In practice it has been found that electric welding by way of an apparatus of the aforementioned character is impractical because it is necessary to employ in connection with the apparatus a costly high voltage and high performance generator in order to produce the required weld temperature by the high frequency electric field between the two electrodes. The use of such a generator is essential because of the negligible dielectric loss factor of the thermoplastic material, especially hard material, while in the presence of the high frequency electric field.

I have found that if, as a preliminary to the electric welding operation, the thermoplastic films to be welded are heated to an appreciable superatmospheric temperature the dielectric loss factor of the thermoplastic material is materially increased. In fact the dielectric loss factor of thermoplastic material increases directly in proportion to temperature increases. Accordingly it is one object of this invention to provide an electric welding apparatus in which provision is made for pre-heating the thermoplastic films to be welded to the end that the dielectric loss factor of the material of which the films are made is materially increased as a preliminary to welding by the high frequency electric current between the electrodes when the latter are in their operative position. By providing pre-heating means for the thermoplastic films to be welded it is possible to utilize an inexpensive low voltage and low performance high frequency generator.

Another object of the invention is to provide an electric welding apparatus of the type and character under consideration in which the means for pre-heating the thermoplastic films to be welded is in the form of an electric resistance element which is associated with one of the electrodes and is included in a circuit having a thermostat for controlling or regulating the pre-heating temperature to which the thermoplastic films to be welded are subjected.

A further object of the invention is to provide an electric welding apparatus which is generally of new and improved construction, may be operated at a low cost and is characterized by simplicity of design and construction.

A still further object of the invention is the provision of an electric welding method which involves pre-heating of the thermoplastic films to be welded and is carried out by a welding apparatus of the aforementioned character.

Other objects of the invention and the various advantages and characteristics of the present apparatus and method will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a view, partly in front elevation and partly in section, of an electric welding apparatus embodying the invention, the electric circuit for supplying high frequency current to the electrodes of the apparatus and the electric circuit for supplying current to the resistance element for effecting pre-heating of the thermoplastic films to be welded being shown diagrammatically;

Figure 2 is a vertical transverse section taken on the line 2—2 of Figure 1 and showing the apparatus without the aforementioned electric circuits; and Figure 3 is a perspective view showing a container in the form of a pair of complemental flanged cup-shaped sections after the flanges of the sections have been welded together by the apparatus of Figures 1 and 2.

The invention is embodied in an apparatus like that of Figures 1 and 2 of the drawings and involves not only the apparatus but also the method which is carried out in connection with use of the apparatus. In general the apparatus comprises a stationary electrode 4, a vertically movable electrode 5 above the electrode 4, a high frequency electric generator 6 and an electric resistance element 7. As described hereafter more in detail the apparatus is adapted to weld a container consisting of a cup-shaped lower section 8 and a complemental cup-shaped upper section 9 which are formed of films of polyvinyl chloride or other so-called "plastic" material that is thermoplastic and is also capable of being welded. The lower section of the container is provided with a continuous outwardly extending integral flange 8a on the upper margin of its side wall and the upper section 9 of the container is provided with a corresponding continuous flange 9a on the lower margin of its side wall. The apparatus serves in connection with operation thereof to weld together the flanges 8a and 9a in order that the sections of the container are permanently connected together after the welding operation. The weld whereby the flanges 8a and 9a are permanently secured together results in the container as a whole being sealed hermetically.

The stationary electrode 4 is cup-shaped and consists of a flat bottom wall 10 and an upstanding continuous side wall 11. It is shaped to receive the lower section 8 of the container, as shown in Figure 1 of the drawing, and is formed of aluminum or any other suitable material which has high heat and electrical conductivity. The top surface of the continuous side wall 11 of the stationary electrode is flat and is adapted to have the flange 8a of the lower container section 8 rest on it during a welding operation. The bottom wall 10 is of appreciable thickness. It is flat and rests on, and is suitably secured to, a horizontal supporting plate 12 of any suitable electric insulating material. The supporting plate 12 is materially larger than the stationary electrode 4. It is adapted to rest on any suitable supporting surface and has at opposite sides thereof a pair of upstanding posts 13, the purpose of which will be set forth hereafter. The posts 13 are spaced outwards from the electrodes 4 and 5 and have the lower ends thereof fixedly connected to the supporting plate 12.

The vertically movable electrode 5 is the same in size and shape as the stationary electrode 4 but is reversely positioned. It comprises a flat top wall 14 and a continuous depending side wall 15 and is preferably formed of the same material as the stationary electrode 4. The interior of the vertically movable electrode 5 is shaped and adapted to receive the upper section 9 of the container. The bottom surface of the continuous side wall 15 of the electrode 5 is flat and is adapted to fit against the flange 9a of the upper container section 9 when the electrode 5 is in its operative position wherein it is located directly above the stationary electrode as shown in full lines in Figure 1. The electrode 5 is mounted to slide vertically into and out of its operative position by way of a pair of upstanding rods 16 and a pair of bearings 17. The rods 16 are arranged in parallel relation and extend slidably through the bearings 17. The lower ends of the rods are connected by screw threads to tubular bushings 18 which are formed of electrical insulating material and are suitably fixed within correspondingly shaped sockets 19 in the top wall 14 of the electrode 5. The bearings 17 are fixedly connected at one side thereof to a horizontally extending rod 20, the ends of which are connected by set screw equipped collars 21 to the upper portions of the upstanding posts 13. The collars 21 extend around the central portions of the posts 13 and are secured thereto by way of their set screws. The electrode 5 is slid downwards and upwards into and out of its operative position by any suitable means, such, for example, as the gear mechanism that is shown in the drawing. Such mechanism comprises a horizontally extending rock shaft 22, a pair of pinions 23 and a pair of racks 24. The ends of the rock shaft 22 extend through, and are journalled in, a pair of bearings 25 which are suitably connected to the upper ends of the upstanding posts 13. One end of the rock shaft is provided with a radially extending handle equipped lever 26 whereby the shaft may be rocked or turned back and forth. The pinions 23 are keyed or otherwise fixedly secured to the central portion of the rock shaft and are spaced apart the same distance as the rods 16. The racks 24 are formed as integral parts of the upper end portions of the rods 16 and mesh with the pinions 23 on the rock shaft. When the rock shaft is turned in one direction it operates through the medium of the pinions 23, the racks 24 and the rods 16 to slide the electrode 5 downwards into its operative position and when the rock shaft is turned in the opposite direction it operates through the aforementioned parts to slide the electrode 5 upwards into an inoperative position wherein it is spaced an appreciable distance above the stationary electrode 4.

The high frequency electric generator 6 of the apparatus is suitably mounted at any desired location in the vicinity of the electrodes and is of low voltage and low performance. It is electrically connected to the stationary electrode 4 by a conductor 27 and is electrically connected to the vertically movable electrode 5 by a flexible conductor 28. The conductor 28 is of sufficient length so as to permit vertical sliding movement of the electrode 5 into and out of its operative position. When the generator 6 is in operation while the electrode 5 is in its operative position as shown in full lines in the drawing, a high frequency electric field is established between the lower portion of the side wall 15 of the electrode 5 and the upper portion of the side wall 11 of the electrode 4. The heat resulting from such field is used to weld together the flanges 8a and 9a of the lower and upper container sections 8 and 9.

The electric resistance element 7 extends longitudinally through a horizontally positioned tube 29 in a horizontal bore 30 in the bottom wall 10 of the stationary electrode 4. The tube is formed of any suitable material which will not conduct electricity but has comparatively high heat conductivity in order that the heat that is generated by the resistance element in connection with the supply of current thereto will be transmitted to, and absorbed by, the electrode 4. One end of the resistance element 7 is connected to the negative side of a battery 31 by a conductor 32 and the other end of the resistance element is connected to the positive side of the battery by way of a conductor 33. The conductor 33 includes a switch 34 in order that the supply of current to the electrical resistance element 7 may be cut off or terminated when desired. It also includes a conventional or standard thermostat 35 which is in contact with the stationary electrode 4 and serves, when the switch 34 is closed, to control or regulate the supply of current to the resistance element to the end that such element heats the electrode 4 to a pre-determined temperature. The purpose of the electric resistance element 7 is so to heat the electrode 4 that when the flanges 8ª and 9ª are placed on the top surface of the continuous side wall 11 as a preliminary to moving the electrode downwards into its operative position such flanges are preheated to a sufficiently high degree materially to increase the dielectric loss factor of the polyvinyl chloride or other similar thermoplastic film material of which the container is formed. By preheating the flanges 8ª and 9ª so that the dielectric loss factor is materially increased electric welding of the flanges may be accomplished by use of a comparatively inexpensive low voltage and low performance high frequency electric generator. In other words, by utilizing the electric resistance element 7 to heat the electrode 4 the flanges 8ª and 9ª of the container sections may be preheated to a degree necessary so to reduce the dielectric strength of the polyvinyl chloride or other thermoplastic film material of which the container is formed as to make it possible to weld the flanges together by the heat from a high frequency field which is produced by a low voltage and low performance electric generator.

When it is desired to use the apparatus to weld together the flanges of the lower and upper sections of the container the electrode 5 is slid upwards into its inoperative position by proper rotation of the rock shaft 22 through the medium of the handle equipped lever 26. After the electrode 5 has been slid into its inoperative position the lower container section 8 is placed in the stationary electrode 4 and arranged so that its flange 8ª rests on the top surface of the continuous side wall 11. Thereafter the upper container section 9 is placed over the lower section and arranged so that its flange 9ª is in overlying relation and registry with the flange 8ª on the lower section. After proper positioning of the upper container section the two container sections are permitted to remain in place until the flanges thereof constituting the weld zone have been preheated by the heat from the electric resistance element 7 to such a degree that the dielectric strength of the material of which they are formed is materially reduced. As soon as the flanges of the container sections are preheated to the desired extent the electrode 4 is slid downwards into its operative position. When the electrode 4 is in such position while the generator 6 is in operation a high frequency electric field is produced between the lower portion of the side wall 15 of the electrode 5 and the upper portion of the side wall 11 of the electrode 4 and such field produces the necessary heat to effect permanent welding together of the flanges 8ª and 9ª of the container sections. In practice it has been found that if the container sections 8 and 9 are formed of comparatively hard polyvinyl chloride preheating of the flanges 8ª and 9ª to a temperature of approximately 250° Fahrenheit will permit the desired electric welding together of the flanges by use of only an inexpensive low voltage and low performance generator.

The herein described electric welding apparatus is essentially simple in design and inexpensive to produce and this is directly attributable to the fact that the electric resistance element 7 for preheating the thermoplastic material in the zone to be welded makes it possible to employ a high frequency electric generator of low voltage and low performance. It effectively and efficiently fulfills its intended purpose and because of the use of a low voltage and low performance generator may be operated economically.

Whereas reference has heretofore been made to thermoplastic film it is to be understood that the word "film" is used generically and is intended to cover all films of appreciable thicknesses as well as sheets. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. An apparatus adapted electrically to weld together films of polyvinyl chloride or like thermoplastic material that has heat-reducible dielectric strength and is capable of being welded, and comprising a pair of opposed electrodes adapted to have the films to be welded placed between them and mounted to move relatively to one another into and out of an operative position wherein they are in close proximity to the films, a high frequency electric generator in circuit with the electrodes and adapted when in operation and the electrodes are in their operative position with the films therebetween to create between said electrodes a high frequency electric field the heat of which serves to weld the films together, and means associated with one of the electrodes and operative so to heat the one electrode that when the electrodes are in their operative position with the films therebetween the films are heated by conducted heat to such an extent that their dielectric strength is reduced to a point where they may be readily welded by the heat from the generator-produced high frequency field between the electrodes.

2. A welding apparatus in accordance with claim 1 wherein one of the electrodes is cup-shaped.

3. An apparatus adapted electrically to weld together films of polyvinyl chloride or like thermoplastic material that has heat-reducible dielectric strength and is capable of being welded, and comprising a pair of opposed electrodes adapted to have the films to be welded placed between them and mounted to move relatively to one another into and out of an operative position wherein they are in close proximity to the films, a high frequency electric generator in circuit with the electrodes and adapted when in operation and the electrodes are in their operative position with the films therebetween to create between said electrodes a high frequency electric field the heat of which serves to weld the films together, and means embodying an electric resistance element in associated relation with one of the electrodes and operative so to heat the one electrode that when the electrodes are in their operative position with the films therebetween the films are heated by conducted heat to such an extent that their dielectric strength is reduced to a point where they may be readily welded by the heat from the generator-produced high frequency electric field between the electrodes.

4. A welding apparatus in accordance with claim 3 wherein one of the electrodes is cup-shaped.

5. An apparatus adapted electrically to weld together films of polyvinyl chloride or like thermoplastic material that has heat-reducible dielectric strength and is capable of being welded, and comprising a pair of opposed electrodes adapted to have the films to be welded placed between them and mounted to move relatively to one another into and out of an operative position wherein they are in close proximity to the films, a high frequency electric generator in circuit with the electrodes and adapted when in operation and the electrodes are in their operative position with the films therebetween to create between said electrodes a high frequency electric field the heat of which serves to weld the films together, and means embodying an electric resistance element in one of the electrodes, a thermostat for the electrode and electric current supply means in circuit with the element and the thermostat and operative so to heat the one electrode that when the electrodes are in their operative position with the films therebetween the films are heated by conducted heat to such an extent that their dielectric strength is reduced to a point where they may be readily welded by the heat from the generator-produced high frequency electric field between the electrodes.

6. A welding apparatus in accordance with claim 5 wherein the one electrode is cup-shaped and the electric resistance element is mounted in said one electrode.

7. That improvement in electrically welding juxtapositioned films of polyvinyl chloride or like thermoplastic material that has heat-reducible dielectric strength and is capable of being welded, which comprising heating by conduction the films in the zone to be welded in order to reduce the dielectric strength of the material in said zone and then creating about said zone a high frequency electric current of such magnitude that the heat resulting therefrom welds the films together at said zone.

KURT NIEBLING.

REFERENCES CITED

The following references are of record in the file of this patent:

UNITED STATES PATENTS

| Number | Name | Date |
|---|---|---|
| 2,016,627 | Conti et al. | Oct. 8, 1935 |
| 2,054,086 | Jones | Sept. 15, 1936 |
| 2,095,910 | Bergstein | Oct. 12, 1937 |
| 2,179,224 | Soubier | Nov. 7, 1939 |
| 2,221,727 | Stenberg | Nov. 12, 1940 |
| 2,238,378 | Summerfield | Apr. 15, 1941 |
| 2,406,714 | Strickland, Jr. | Aug. 27, 1946 |
| 2,480,299 | Klinke | Aug. 30, 1949 |
| 2,494,905 | Shuman | Jan. 17, 1950 |
| 2,509,181 | Zimmerman | May 23, 1950 |
| 2,517,672 | Jenkins | Aug. 8, 1950 |
| 2,565,161 | Wilmotte et al. | Aug. 21, 1951 |
| 2,574,094 | Fener et al. | Nov. 6, 1951 |
| 2,581,977 | Spaulding et al. | Jan. 8, 1952 |